Oct. 23, 1934.    A. P. DAVIS    1,977,624
POSITION CONTROL SYSTEM
Filed July 8, 1930
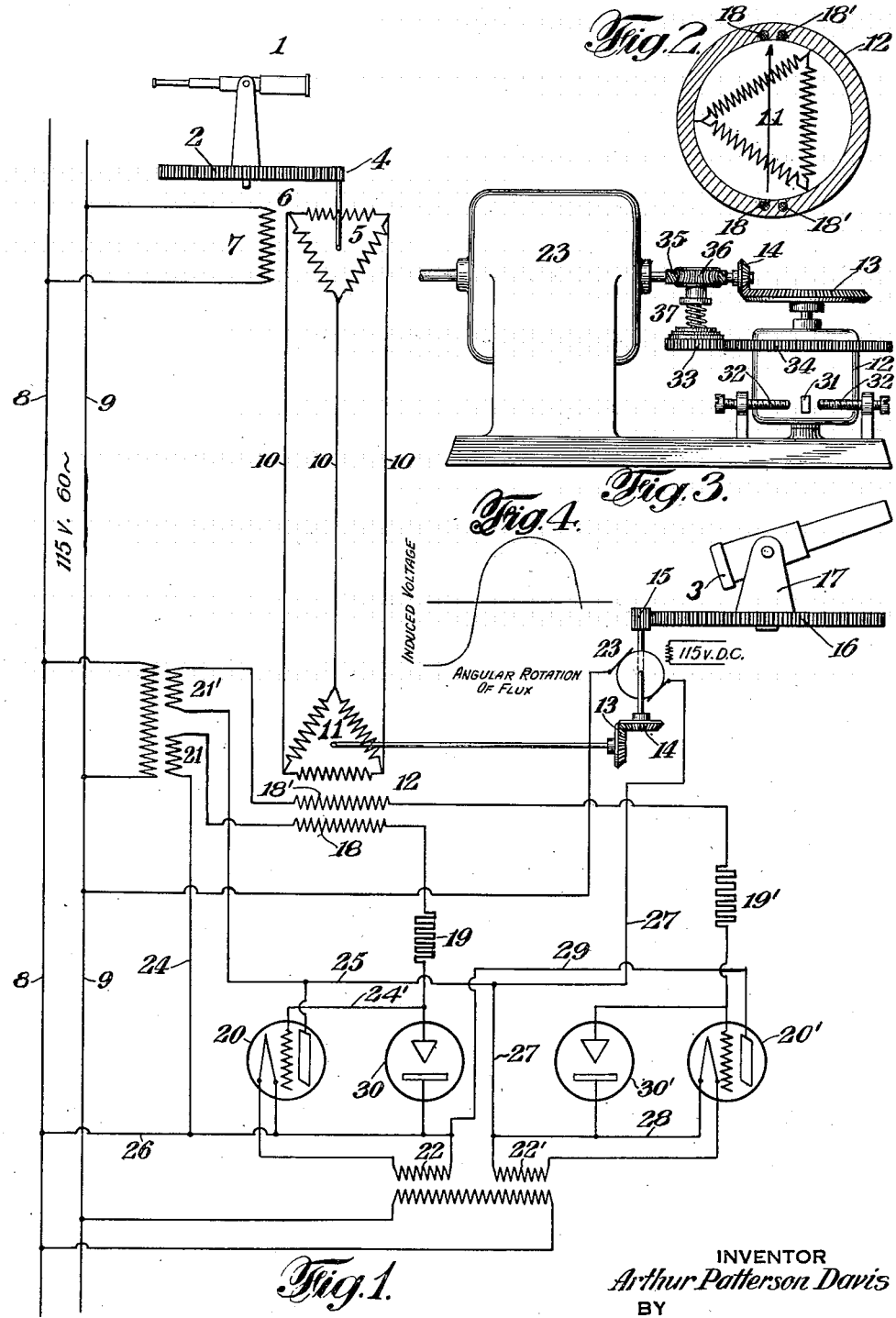
INVENTOR
Arthur Patterson Davis
BY
Edwards, Bower & Pool
ATTORNEYS Patented Oct. 23, 1934

1,977,624

UNITED STATES PATENT OFFICE 1,977,624

POSITION CONTROL SYSTEM

Arthur Pattison Davis, New York, N. Y., assignor to Arma Engineering Co., Inc., Brooklyn, N. Y., a corporation of New York Application July 8, 1930, Serial No. 466,388

10 Claims. (Cl. 172—239)

This invention relates to a synchronous position control system and has for its object the provision of means for controlling the angular displacement of a driven object in accordance with the angular displacement of a controlling object.

More specifically the invention relates to a system of the type described which is sufficiently accurate and fast to serve as a control means for setting or maintaining the position of guns for firing on a distant target. The permissible error in a system for this purpose is much less than that allowable in position control systems for other purposes, since an error as low as five-tenths of one angular degree would prevent accuracy of fire at long range, while in order to obtain rapidity of fire it is essential that there be no appreciable time lag in such a system. Also, where guns are mounted on a ship, due to the yaw and other movements of the vessel, the position of the sighting telescope must be reproduced in such manner as to cause the guns controlled thereby to instantly correspond to such position. My system is, furthermore, extremely rugged and comprises a minimum amount of apparatus, whereby the same is particularly adapted for the severe conditions which obtain during the firing of heavy guns.

An important object of my invention is to eliminate the tendency of the driven object to overrun the correct position, which is always accompanied by a strong tendency to oscillate or "hunt", and thereby eliminate the necessity of providing separate means for counteracting this tendency. This also results in preventing lag or angular difference between the controlling and driven objects while they are in motion, which lag is introduced by the various means used in other systems for preventing overrunning.

Another object of my invention lies in the provision of a control system in which a very minute movement of the controlling object is sufficient to call into play the full power of the means driving the controlled object.

A further object of the invention is to eliminate or reduce the error normally introduced by the electrical system connecting the transmitting and control devices.

A still further object of the invention is to eliminate the amplifying tubes usually necessary in position control systems of the type described, and thus simplify the circuits and reduce the probability of trouble due to failure of such tubes.

My arrangement also permits the use of half-wave rectifiers which eliminates the necessity of employing resistances for preventing short-circuiting of the tubes. The system also has means for preventing simultaneous operation of the tubes.

Referring to the drawing, Fig. 1 shows my invention as embodied in a system of controlling gun fire by means of a telescope.

Fig. 2 illustrates diagrammatically the arrangement of the stator windings of the control device employed, and Fig. 3 shows a means for compensating for the mechanical lag introduced by the driving gear train connecting the gun platform and the driving motor.

Fig. 4 shows the variation of the induced voltage with rotation of the flux axis in the control device of Fig. 2.

In Fig. 1 a telescope 1 is shown as mounted on a circular rack 2 so that the latter will move with the telescope through any angular displacement of the same. The telescope may be trained on a target to determine the proper setting of a heavy gun 3. This is performed by insuring that the angular displacement of the gun will always conform to the angular displacement of the telescope, and that any change in displacement of the latter will be instantly and accurately communicated to the gun and the latter caused to instantly follow-up and take the new position. In the control of gun fire any lag in the system, or any overrunning or hunting, introduces such error as to impair the efficiency of the gun, and while various systems have been devised for reproducing angular position, such systems will not operate within the permissible error of a system suitable for fire control.

As shown in the drawing the telescope is operatively connected by means of circular rack 2 and gear 4 to rotor 5 of the transmitter 6. The latter is of the well-known type having a stator winding 7 which is excited by a source of alternating current from conductors 8 and 9. The rotor is in inductive relation to the stator and has three windings which are spaced approximately sixty degrees apart and are wound in such direction that when the rotor is in the neutral position the instantaneous value of the alternating current induced in the rotor 5 will be such that the axis of the stator field will be parallel to that of the rotor. The three windings of each rotor are connected in circuit by means of slip rings (not shown). Any rotation of rotor 5 caused by angular movement of the telescope mounting produces a corresponding angular shifting of the axis of the magnetic field in rotor 11, and in consequence an angular relation between the axis of the magnetic field of the rotor 11 and the windings 18, 18' of the control device 12. Normally, when the telescope and rotor 5 are in neutral position the forces are balanced and no currents are induced in the windings 18, 18', but upon the shifting of the axis of the magnetic field of rotor 11, an unbalanced condition will result and persist until the magnetic axes again coincide. During this unbalanced condition the pulsating field of rotor 11 will induce pulsating voltages in windings 18, 18', the direction of which, i.e., whether the first half cycle of which will be positive or negative, will depend upon which side of the neutral line the controller axis is moved to. The rotor of control device 12 is independently connected by means of gears 13 and 14 to a direct current driving motor 23, independent of the load drive gear. The driving motor is operatively connected to gun mount 17 by means of a gear train comprising circular gears 15 and 16.

The electromotive forces induced in stator windings 18 and 18', which are oppositely wound, are used to control driving motor 23 by controlling the grids of suitable relay devices, such as thermionic tubes 20 and 20' having filament, grid and plate electrodes. Each of the tubes functions as a half wave rectifier controlled by the voltages induced in its associated stator winding. The filaments of the relays are preferably energized from a source of alternating current and the proper voltage is supplied by means of a step down transformer having two secondaries 22 and 22', each of which supplies one of the filaments. The grid of tube 20 is connected by means of conductor 24' and grid leak resistance 19 to stator winding 18, and thence through a grid-biasing transformer winding 21 through conductor 24 to one side of the filament of the tube, thus completing the grid circuit. The plate of tube 20 is connected by conductor 25 to driving motor 23 and thence to conductor 9 of the alternating current supply source, the plate circuit being completed by connection 26 from conductor 8 to the filament of the tube. In a similar manner relay 20' has its grid connected through grid leak 19' to stator winding 18' and thence through grid-biasing transformer secondary 21', returning by conductors 25, 27 and 28 to the filament to complete the grid circuit. The plate of this tube is connected through conductors 29 and 26 to one side 8 of the alternating current supply line, the other side of the supply line being connected through driving motor 23, conductors 27 and 28 to the filament to complete the plate circuit. The arrangement of the relays is such that one is operative for each direction of rotation of the controlling telescope to cause a corresponding rotation of the driving motor.

The operation of the system is as follows: As the angular position of the telescope is varied the winding 5 is rotated thereby inducing alternating electromotive forces in conductors 10 and a magnetic field in rotor 11 of control device 12, the axis of which field has the same angular relation to the windings 18, 18' as does the axis of the field of rotor 5 to the stator winding 7. The shifting magnetic field and the voltages induced thereby in windings 18 and 18' will have a direction with respect to the alternating current supply source 8, 9 which will be determined by the direction of the angular relation between the telescope and rotor 5. Due to the employment of currents of substantial value for operating the driving motor, the relays employed are usually those of the gas filled type in which a relatively large negative value is imparted to the grid to prevent current flow through the tube, and starting is accomplished by reducing grid voltage to a less negative value at which ionization occurs whereupon the full plate current flows in accordance with well understood principles, the start occurring before a positive grid value is reached.

Considering the action of one tube only (the action with respect to the other tube being similar but occurring one half cycle out of phase), the plate voltage, (on tube 20', for example) in the motor circuit alternates from positive to negative and at the same time the grid voltage likewise alternates, but in opposition, the transformers 21, 21' being so wound that normally when the plate is positive the grid will be negative, thus normally preventing current flow. Assuming the telescope to be given angular position on one side of neutral, a voltage will be induced in coil 18' in opposition to that induced by the transformer 21' and hence on each alternate half cycle will reduce the negative value of the grid voltage, coincident with the rise in plate voltage, and hence the tube will start on each half cycle, and stop with the fall of plate current to zero. During the other half cycle, although the grid will be less negative, the plate will be negative and hence the tube will not pass current. If the telescope be shifted to the other side of neutral the grid will be given negative potential when the plate is positive and made less negative when the plate is negative. Hence when the telescope is at one side of neutral the tube will operate and when the telescope is at the other side of neutral will not operate. But under the latter condition the other tube will be operative in the same manner as above described with respect to the first tube.

Thus the driving motor 23 will be driven in one direction or the other, according to the angular direction of the telescope and as long as the angle persists. When the motor has returned the rotor 11 to the position where the axes of rotor and stator fluxes coincide, the motor will stop.

Since gaseous rectifiers of the grid controlled type normally pass the full current when a trigger voltage, normally two or three volts minus, is imposed upon the grid, it will be seen that the control of the starting and stopping of the driving current will be extremely sensitive. Moreover, by reason of the fact that the control rotor 11 is directly connected to the driving motor there is no opportunity for error by reason of lag introduced into the system by the gearing between driving motor and load.

I have found that the driving motor in my arrangement will function satisfactorily with half wave rectifiers, and by using these instead of full wave rectifiers the resistances which are necessary in the output circuits of the latter to prevent a short-circuit of the devices in the event that both operate at one time are unnecessary. The normal reactance of the circuit employed will limit the current under this condition, and I am thereby able to simplify the circuit and avoid the use of objectionable resistance elements.

Each of the rectifier tubes is operative for a given direction of rotation of the telescope, and in order to eliminate the possibility of either tube operating at the wrong time due to ionization of the tube by a flow of grid current when the plate is negative, I employ rectifiers 30 and 30' connected across the grid circuits of the respective tubes. These rectifiers are preferably of the dry or oxide type, although tubes of other types may be used, and are so polarized as to lead off positive potential applied to the grid of either tube during its inoperative period. This prevents an ionized condition due to flow of grid current and thereby prevents a flow of plate current on the succeeding half cycle during the time when the tube should remain inoperative.

In order to minimize the error introduced by the electrical system connecting the transmitter 6 with the control device 12, due to the electrical errors of transmission, I employ a gear ratio to speed up the rotor of the transmitter. For example, a ratio of 36: 1 between gears 2 and 4, and 16 and 15, will reduce the angular error between the telescope and gun to approximately 1/36 of the error normally introduced, and this is well below the permissible error in a system for the purpose stated.

In systems heretofore proposed there is a strong tendency to overrun the correct position accompanied by a tendency to "hunt" or oscillate, and where means are introduced to displace the phase of the control system or to advance the deceleration of the driving motor in accordance with an anticipated final position of the driven object, there is introduced thereby a lag or angular difference between the controlling and driven objects while in motion, which lag increases with the speed of rotation.

I have discovered that one cause of the tendency to overrun and "hunt" lies in the fact that when the driving motor begins to move in response to a movement of the controlling telescope, the motion is not immediately communicated to the control device. This is so because of two reasons. First, the control device has heretofore been associated with the driven object rather than with the driving motor. A gear train is usually employed between the driving motor and the driven object or load, and since considerable force must be transmitted through this train, the control device has been subjected to a slight lag in its operation (backlash and the like) which have caused the change in the control device voltage to lag behind the driving motor position. Also, where the driven load and control device are connected to the same driving shaft, there may be torsional or other effects introduced in the shaft by the load sufficient to produce lag. Therefore, the current through the driving motor has not been adjusted in accordance with the required speed, and as a result of the latter, overrunning of the motor accompanied by surging and oscillation occurs, and this introduces such error and time lag as to prevent the use of such a system where accuracy of position and speed are vital.

A consideration of the factors involved shows that this overrunning is due principally to the stored energy in the driving system which becomes manifest whenever the speed of the driving system is different from that of the control system. If, however, the control rotor be directly connected by independent means, such as gears 13 and 14, to the driving motor, the lag between the movements of the driving motor and corresponding changes of the control voltage will be eliminated. Under this condition the driven system will not acquire any appreciable velocity relative to the control system within the power capacity of the driving motor.

A second reason why lag between the driving motor and the control motor is present in other systems is lack of sensitivity of the control circuit, due principally to the use of a type of control device the field of which comprises a two pole magnetic structure in which the pole pieces cause a considerable distribution of the flux about the rotor, in which case the flux axis of the rotor must be turned through a large angle (approximately 90°) to induce full voltage in the field. In my arrangement, however, as shown diagrammatically by Fig. 2 of the drawing, the field consists of a slotted stator instead of a polar structure, the coils 18 and 18' being parallel and wound in two adjacent slots whereby their turns are concentrated into a small arc with respect to the flux axis of the rotor. The arrow of Fig. 2 illustrates the normal position of the flux axis of the rotor field and it will be seen that a very small rotation of the flux axis in either direction will cause a maximum rate of change in the induced voltage in the field coils 18 and 18'. Because of this a very minute movement of the telescope will induce a sufficient voltage in the field coils to cause the proper rectifier to instantly pass sufficient plate current to cause the driving motor to drive the gun into positional agreement. The control device will be designed to cause the maximum rate of change in the induced voltage upon a minimum rotation of the flux axis and quickly reduce the normal negative bias to the trigger voltage to start the tube. In practice by suitable design the angular movement of the flux axis necessary to give the desired rapid increase in induced voltage may be made to assume very low values, for example as low as an angle of ½° or less, thereby making it possible to cause a very slight movement of the controller field axis to induce the necessary critical starting potential upon the grid of the tube.

Briefly stated, the control devices used in other systems cause a gradually increasing voltage having a sinusoidal wave form to be induced by movement of the controlling object, whereas, in my system the voltage rise (shown graphically in Fig. 4) is very large for a minute initial movement of the controlling object. Since the rate of change of the induced voltage from zero to maximum is extremely high, a very slight movement of the controller will instantly apply starting potential to the grid and thereupon full current in the appropriate direction is caused to be applied to the driving motor upon the most minute deviation between the controlling and driven objects and this causes the full torque of the driving system to be exerted instantaneously with any movement of the controlling object.

In addition to the foregoing, the field coils 18 and 18' are wound with many turns of small wire so that the control device also functions as a step up transformer whereby a minute rotation of the flux axis in the rotor or armature produces a high voltage in the field coils, and the higher voltage thus induced not only increases the sensitivity of the control system but also eliminates the necessity of providing amplifiers intermediate the control device and the rectifying tubes. Because of the fact that the value of the maximum voltage which may be induced in the field coils by rotation of the flux axis is several hundred times greater than that necessary to put the rectifier tubes into action, the displacement of the flux axis from the normal central position never exceeds very small values.

Fig. 3 shows a means for compensating for lost motion in the gear train driving the gun mount. Control device 12 has its stator arranged to rotate through a small angle determined by lug 31 and stops 32. Driving motor 23 is connected by means of worm 35 and gear 36 to a friction clutch arrangement 37 which through the medium of gears 33 and 34 causes the stator of the control device to be rotated by driving motor 23 to a position determined by one of the stops 32, dependent upon the direction of rotation. This rotation is at a lower speed than that of the rotor of control device 12 so as not to interfere with the control of the device. The gears 13 and 14 of Fig. 3 correspond to those of Fig. 1, and any suitable gear ratio may be used dependent upon the desired speed of driving motor 23. The arrangement functions to rotate the stator of the control device through the proper angle whenever the direction of movement of the driving motor is reversed, and the direction in which the stator is rotated is such as to increase the theoretical revolutions of driving motor 23 by a small amount necessary to take back lash in the driving gear train. Adjustment of this compensation is made by adjustable stops 32.

While I have described my invention as applied to a system for setting and maintaining the position of heavy guns it is to be understood that my system is equally well adapted for causing and maintaining positional agreement between controlling and controlled objects in general. Also, various modifications will readily suggest themselves to those skilled in the art without the exercise of inventive skill, and I, therefore, do not wish to be limited except as indicated by the scope of the appended claims.

I claim:

1. A control system for reproducing position comprising in combination with a controlling object and a controlled object, a driving motor for said controlled object, means for inducing a voltage upon positional disagreement of said objects corresponding in direction to the direction of such positional disagreement, a plurality of thermionic tube relays having plate circuits controlling said driving motor, a source of alternating current supply connected to energize the plate circuits of said relays in opposite directions, and means for impressing said induced voltage on the grid circuits of one or the other of the relays depending upon the direction of said positional disagreement, whereby said motor will drive the controlled object in either direction into positional agreement with the controlling object, and means operatively connected to said grid circuits to prevent the grids from becoming sufficiently positive to cause ionization by grid current, said means preventing undesired operation of the tubes.

2. A control system for reproducing position comprising in combination with a controlling object and a controlled object, a driving motor for said controlled object, means for inducing a voltage upon positional disagreement of said objects corresponding in direction to the direction of such positional disagreement, a plurality of thermionic tube relays having plate circuits controlling said driving motor, a source of alternating current supply connected to energize the plate circuits of said relays in opposite directions, and means for impressing said induced voltage on the grid circuits of one or the other of the relays depending upon the direction of said positional disagreement, whereby said motor will drive the controlled object in either direction into positional agreement with the controlling object, and a rectifier connected to each of said grid circuits to prevent the grids from becoming sufficiently positive to cause ionization by grid current, said rectifier preventing undesired operation of the tubes.

3. Means for reproducing position comprising in combination with a controlling object and a controlled object, driving means for the controlled object, an inductive control device for the driving means provided with an armature and a slotted stator having a plurality of stator coils, said armature and stator coils having a normal neutral position with relation to each other corresponding to positional agreement of said objects, means for inducing a voltage in the armature during positional disagreement of said objects, each of said stator coils having its windings concentrated in parallel slots near the magnetic axis of the armature in said neutral position whereby movement of said axis in portions of the arc of movement near said neutral position produces a relatively greater rate of change in flux than movement in other portions of said arc.

4. A control system for reproducing position comprising in combination with a controlling and a controlled object, an inductive control device comprising an armature and a field shiftable relatively to each other to an extent depending upon the extent of movement of the controlling object relative to the controlled object, a motor for driving the controlled object, and means mechanically connecting said field to said motor for automatically moving said field of said control device in a direction to increase said relative shift between said field and said armature to compensate for lost motion between said motor and said controlled object.

5. A control system for reproducing position comprising in combination with a controlling and a controlled object, a control device having rotor and stator elements, means for causing rotation of the magnetic field of said control device in a direction dependent upon the direction of movement of the controlling object, a reversible motor adapted to drive the controlled object through a driving gear train, a second gear train connecting said rotor of said controlled device to said driving motor, and a third gear train between said motor and said stator adapted to shift said stator in a direction to increase the relative rotation of said magnetic field to compensate for lost motion between said motor and said controlled object.

6. A control system for reproducing position between a controlling and a controlled object comprising a direct current motor for driving said controlled object, means comprising an alternating current rectifier tube for energizing the driving motor and having a control electrode, means for varying the control voltage on said electrode to start said tube upon a predetermined movement of the controlling object relative to the controlled object, and means preventing starting of said tube during other movements of said controlling object comprising means for limiting the positive voltage impressed on said electrode to a predetermined maximum.

7. A control system for reproducing position comprising in combination with a controlling and a controlled object moved by a driving motor, a plurality of rectifier tubes for energizing said driving motor in opposite directions and having grid electrodes for controlling the starting of the tubes, means for inducing a control voltage by positional disagreement of the controlling and controlled objects and impressing said voltage on the grid circuit of one of the rectifiers to start said rectifier and drive said motor in one direction, and means for retaining another rectifier tube inactive during said drive comprising an auxiliary rectifier connected and polarized to limit the positive voltage on the grid of said other rectifier to a predetermined maximum.

8. In a control system for reproducing position the combination with a controlling and controlled object having a driving motor, of means for controlling said motor from said controlling object comprising a power rectifier tube having cathode and anode electrodes and a control electrode for controlling the starting of the tube, a source of alternating current plate supply connected to the tube, means for applying a normal negative bias to the control electrode and for reducing said negative bias to start said tube under predetermined conditions, and a bypass connected to said electrode to lead-off positive potential above a predetermined maximum and prevent starting of the tube by an excess of positive voltage on said control electrode.

9. A control system for reproducing position comprising a controlling object, an object to be controlled and a motor to move said object, a thermionic rectifier tube of the gas filled type connected to have its plate circuit supply current of half wave impulses to drive said motor in one direction and a similar tube connected to drive the motor in the opposite direction, the normal reactance of the motor circuit acting to control the motor current so that said motor functions to move said object in either direction, a control grid electrode in each of said tubes having a critical starting voltage at which it causes ionization so as to pass substantially full operating current to operate said motor in either direction, and means for selectively starting either of said tubes by corresponding movement of the controlling object comprising a primary winding having a magnetic field rotated by movement of the controlling object and a secondary winding of larger number of turns having alternating voltage induced in it by said primary winding and directly connected to each of said grid electrodes in each of said tubes to vary the voltage thereon.

10. A control system for reproducing position comprising a controlling object, an object to be controlled and a motor to move said object, a thermionic rectifier tube of the gas filled type connected to have its plate circuit supply current of half wave impulses to drive said motor in one direction and a similar tube connected to drive the motor in the opposite direction, the normal reactance of the motor circuit acting to control the motor current so that said motor functions to move said object in either direction, a control grid electrode in each of said tubes having a critical starting voltage at which it causes ionization so as to pass substantially full operating current to operate said motor in either direction, and means for selectively starting either of said tubes by corresponding movement of the controlling object comprising a primary winding having a magnetic field rotated by movement of the controlling object and a secondary winding with a relatively larger number of turns concentrated in a small arc with respect to the flux axis of the primary winding and having alternating voltage induced in it by said primary winding upon slight shift to said flux axis near said secondary winding and directly connected to each of said grid electrodes in each of said tubes to vary the voltage thereon.

ARTHUR PATTISON DAVIS.